(12) United States Patent
Nam et al.

(10) Patent No.: US 11,598,959 B2
(45) Date of Patent: Mar. 7, 2023

(54) LIGHT SHIELDING FILM FOR HEAD-UP DISPLAY (HUD) AND HUD SYSTEM FOR VEHICLE

(71) Applicant: SAMSUNG ELECTRONICS CO., LTD., Suwon-si (KR)

(72) Inventors: Dong Kyung Nam, Yongin-si (KR); Jinho Lee, Suwon-si (KR); Yoonsun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 16/895,465

(22) Filed: Jun. 8, 2020

(65) Prior Publication Data
US 2021/0157136 A1 May 27, 2021

(30) Foreign Application Priority Data
Nov. 26, 2019 (KR) .................. 10-2019-0153169

(51) Int. Cl.
*G02B 27/28* (2006.01)
*G02B 27/01* (2006.01)
*G02B 5/30* (2006.01)

(52) U.S. Cl.
CPC ........... *G02B 27/0101* (2013.01); *G02B 5/30* (2013.01); *G02B 2027/012* (2013.01)

(58) Field of Classification Search
CPC ............ G02B 27/0101; G02B 5/30; G02B 2027/012; G02B 2207/123; G02B 5/223;
(Continued)

(56) References Cited

U.S. PATENT DOCUMENTS 5,552,935 A 9/1996 Knoll et al.
5,900,976 A * 5/1999 Handschy ........... G02F 1/13362
359/489.07
(Continued)

FOREIGN PATENT DOCUMENTS

CN 105359030 A 2/2016
CN 106353884 A 1/2017
(Continued)

OTHER PUBLICATIONS

Communication dated Jan. 26, 2021 issued by the European Patent Office in counterpart European Application No. 20192780.3.
(Continued)

*Primary Examiner* — Balram T Parbadia
(74) *Attorney, Agent, or Firm* — Sughrue Mion, PLLC

(57) ABSTRACT

Provided is a light shielding film for head-up display (HUD), the light shielding film including a plurality of light shielding materials configured to transmit a first directional light propagating from a view in front of a vehicle in a first direction and block at least a portion of a second directional light propagating from an external light source in a second direction that is opposite to a third direction in which light is output from a display panel for HUD included in the vehicle, at least one gradient of the plurality of light shielding materials corresponding to the first direction, and a transparent material that fills a space between the plurality of light shielding materials.

23 Claims, 10 Drawing Sheets

(58) Field of Classification Search
CPC ...... G02B 5/3033; G02B 5/003; G02B 27/28;
G02B 5/22; G02B 27/01; G02B 5/00;
B60K 2370/1529; B60K 2370/25; B60K
2370/39; B60K 35/00; B60J 3/007; B60J
3/06
See application file for complete search history.

(56) References Cited

U.S. PATENT DOCUMENTS

| | | | |
|---|---|---|---|
| 2012/0224062 | A1 | 9/2012 | Lacoste et al. |
| 2013/0250415 | A1* | 9/2013 | Gupta ...................... G02B 5/30 |
| | | | 359/489.09 |
| 2017/0269428 | A1* | 9/2017 | Otani ................... G02B 6/0055 |
| 2019/0030856 | A1 | 1/2019 | Hayasaki et al. |
| 2019/0317325 | A1 | 10/2019 | Malinovskaya et al. |
| 2020/0103650 | A1* | 4/2020 | Woods ............... G02B 27/0101 |

FOREIGN PATENT DOCUMENTS

| | | |
|---|---|---|
| DE | 3822222 A1 | 1/1990 |
| DE | 10 2017 219069 A1 | 4/2019 |
| JP | 2017-128196 A | 7/2017 |
| JP | 2018-59965 A | 4/2018 |
| KR | 10-2010-0073414 A | 7/2010 |
| KR | 10-2014-0031173 A | 3/2014 |
| KR | 10-1397046 B1 | 5/2014 |
| KR | 10-2015-0106442 A | 9/2015 |
| KR | 10-2018-0032620 A | 3/2018 |
| KR | 10-1911488 B1 | 10/2018 |
| KR | 10-2019-0003784 A | 1/2019 |
| KR | 10-1956497 B1 | 3/2019 |
| TW | 201903473 A | 1/2019 |
| WO | 2013/128615 A1 | 9/2013 |
| WO | 2018/224802 A1 | 12/2018 |

OTHER PUBLICATIONS

Communication dated Jun. 13, 2022 issued by the National Intellectual Property Administration of P.R. China in Chinese Application No. 202010521214.9.

* cited by examiner

LIGHT SHIELDING FILM FOR HEAD-UP DISPLAY (HUD) AND HUD SYSTEM FOR VEHICLE

CROSS-REFERENCE TO RELATED APPLICATION

This application claims priority from Korean Patent Application No. 10-2019-0153169, filed on Nov. 26, 2019 in the Korean Intellectual Property Office, the disclosure of which is incorporated herein by reference in its entirety.

BACKGROUND

1. Field

Example embodiments of the present disclosure relate to a light shielding film for head-up display (HUD) and an HUD system for vehicle.

2. Description of Related Art

A head-up display (HUD) system generates a virtual image in a front view of a driver and displays information in the virtual image, thereby providing a variety of information to the driver. The information provided to the driver may include navigation information and panel information such as revolutions per minute (RPM) of an engine, a fuel level, a driving speed, and the like, for example. The driver may easily acquire information displayed in the front view without moving his or her eyes while driving, which may increase stability in driving. In addition to the navigation information and the panel information, the HUD system may provide the driver with lane markings, construction signs, traffic accident signs, warning signs to indicate pedestrians using an augmented reality (AR) technique to assist the driver in driving when a clear visibility is not secured.

In a case in which the HUD system three-dimensionally realizes visual information, as a field of view (FOV) and a virtual image distance (VID) related to the visual information displayed in the HUD system increase, the visual information may be more effectively delivered to the driver. However, as the FOV increases, an amount of sunlight received in the HUD system may increase. Also, as the VID increases, a density at which the sunlight is collected in the HUD system may increase.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide a HUD light shielding film that protects a display panel from energy of an external light source while not obscuring a view of a driver or a passenger in a vehicle.

According to an aspect of an example embodiment, there is provided a light shielding film for head-up display (HUD), the light shielding film including a plurality of light shielding materials configured to transmit a first directional light propagating from a view in front of a vehicle in a first direction and block at least a portion of a second directional light propagating from an external light source in a second direction that is opposite to a third direction in which light is output from a display panel for HUD included in the vehicle, at least one gradient of the plurality of light shielding materials corresponding to the first direction, and a transparent material that fills a space between the plurality of light shielding materials.

At least a portion of the plurality of light shielding materials may have a same gradient.

Gradients of the plurality of light shielding materials may be within a range of 40° to 85°.

A length of the space between the plurality of light shielding materials may be within a range of 0.3 mm to 0.5 mm.

A thickness of the light shielding film may be within a range of 0.35 mm and 0.40 mm.

The light shielding film may further include a light reflecting material provided on the plurality of light shielding materials and the transparent material, the light reflecting material being configured to reflect the light output from the display panel.

The light shielding film may further include a light transmitting material provided on the plurality of light shielding materials and the transparent material, the light transmitting material being configured to protect the vehicle from an external environment.

The plurality of light shielding materials may be configured to absorb a portion of light incident on the plurality of light shielding materials.

The plurality of light shielding materials may be configured to polarize light.

According to an aspect of another example embodiment there is provided a head-up display (HUD) system for vehicle, the HUD system including a display panel configured to output light including visual information, a magnification optical system configured to magnify the visual information to be displayed, and a light shielding film including a plurality of light shielding materials configured to transmit a first directional light propagating from a view in front of the vehicle in a first direction and block at least a portion of a second directional light propagating from an external light source in a second direction that is opposite from a third direction in which the light including the visual information is output from the display panel, at least one gradient of the plurality of light shielding materials corresponding to the first direction.

At least a portion of the plurality of light shielding materials may have a same gradient.

At least a portion of the plurality of light shielding materials may have different gradients.

At least a portion of the light output from the display panel including the visual information may be reflected by a transparent layer provided adjacent to the light shielding film.

Gradients of the plurality of light shielding materials may be within a range of 40° to 85°.

A length of a space between the plurality of light shielding materials may be within a range of 0.3 mm to 0.5 mm.

A thickness of the light shielding film may be within a range of 0.35 mm to 0.40 mm.

The light shielding film for HUD may further include a light reflecting material provided on a first surface of the light shielding film and configured to reflect the light output from the display panel.

The light shielding film for HUD may further include a light transmitting material provided on a second surface of the light shielding film and configured to protect the vehicle from an external environment.

The plurality of light shielding materials may be configured to polarize light.

The plurality of light shielding materials may be configured to polarize light, and a material configured to polarize light may be further provided on a path of the light output from the display panel.

The plurality of light shielding materials may be further configured to polarize s-polar light and transmit p-polar light, and the material may be further configured to transmit the s-polar light and absorb the p-polar light.

The plurality of light shielding materials may be configured to absorb p-polar light and transmit s-polar light, and the material may be further configured to transmit the p-polar light and absorb the s-polar light.

The plurality of light shielding materials may be configured to absorb a portion of light incident on the plurality of light shielding materials.

The light shielding film may be provided between a windshield of the vehicle and an inner cover layer of the vehicle, at an outer side of the windshield of the vehicle, or at an inner side of the inner cover layer.

The light shielding film may be provided to correspond to a portion of a front window of the vehicle on which the light output from the display panel is incident.

The external light source may correspond to the sun.

Gradients of the plurality of light shielding materials may correspond to a plurality of gazing directions of a driver of the vehicle.

Gradients of the plurality of light materials may correspond to positions of the plurality of light materials.

BRIEF DESCRIPTION OF THE DRAWINGS

The above and/or other aspects will be more apparent by describing example embodiments with reference to the accompanying drawings, in which.

DETAILED DESCRIPTION

Figure 1:
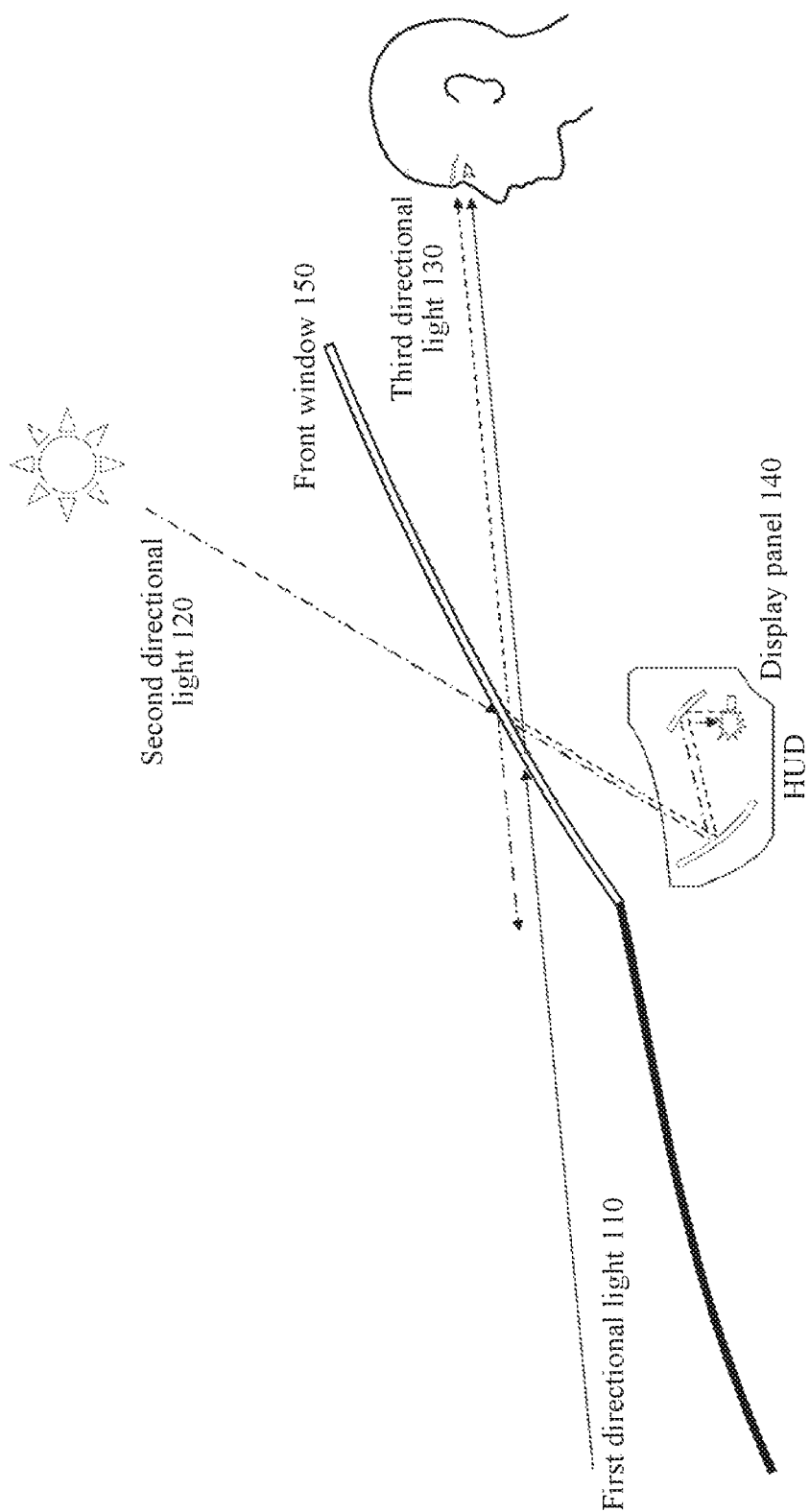
FIG. 1 is a diagram illustrating light traveling in a vehicle HUD system that does not use a light shielding film according to an example embodiment.

Reference will now be made in detail to example embodiments of which are illustrated in the accompanying drawings, wherein like reference numerals refer to the like elements throughout. Example embodiments are described below in order to explain the present disclosure by referring to the figures.

The following structural or functional descriptions are example to merely describe the example embodiments, and the scope of the example embodiments is not limited to the descriptions provided in the present disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating light traveling in a vehicle HUD) system that does not use a light shielding film according to an example embodiment.

Referring to FIG. 1, an HUD system for vehicle that does not use a light shielding film may include a display panel 140 and a magnification optical system. In the present disclosure, the term "HUD system for vehicle" is interchangeably used with the term "vehicle HUD system." Also, the term "light shielding film for HUD" is interchangeably used with the term "HUD light shielding film." The display panel 140 may be a device that outputs light including visual information. The visual information may include, for example, a lane marking, a construction sign, a traffic accident sign, and a warning sign for pedestrians to assist a user in driving when a view in front of the vehicle is not clearly secured, in addition to panel information and navigation information.

Third directional light 130 may correspond to the light that includes the visual information and is output from the display panel 140. The visual information included in the third directional light 130 may be provided to a driver using an augmented reality (AR) technique. For example, the visual information included in the third directional light 130 may be three-dimensionally displayed information.

The magnification optical system may determine a virtual image distance (VID) and a field of view (FOV) related to the visual information included in the light output from the display panel 140. The FOV may be a value for determining a size by which the visual information is viewed by a viewer such as s driver. The VID may be a value for determining a distance between the driver and the visual information to be viewed.

The magnification optical system may include a mirror and/or a lens. For example, the magnification optical system may include two concave mirrors, two convex lenses, or one concave mirror and one convex lens.

The magnification optical system may be determined to have an FOV that has a value sufficiently large for a viewer or driver to secure a visibility for visual information. Also, the magnification optical system may be determined to have a VID sufficiently long to prevent risks during driving even if the driver views the visual information while driving the vehicle. As the FOV increases, an amount of light received by the HUD system from an external light source may increase. Also, as the VID increases, a density at which external light is collected may increase.

Light may be incident from an outside of the vehicle including the vehicle HUD system that does not include the light shielding film inside the vehicle. The light incident from the outside to the inside of the vehicle may include first directional light 110 incident in a direction from the view in front of the vehicle to a front window 150 of the vehicle and second directional light 120 incident from an external light source of a predetermined position.

The view in front of the vehicle corresponding to the first directional light 110 may be determined based on a predicted gaze direction of the driver. The predicted gaze direction of the driver may be determined to be a unique view direction of a main driver or a typical gaze direction of a general person. The predicted gaze direction of the driver may be determined comprehensively based on, for example, a physique, a sitting height, and a width of a viewable range of the main driver or general person.

The front window 150 of the vehicle may be a double-glazed window including a windshield and an inner cover layer. In the double-glazed window, the windshield may correspond to a pane of glass installed outward based on a passenger in the vehicle and the inner cover layer may correspond to a pane of glass installed inward based on the passenger in the vehicle.

The double-glazed window may have higher heat insulation and sound absorption than those of a single glass window. Also, in a case in which a material such as plastic is additionally inserted between the windshield and the inner cover layer, fragments may bounce relatively less from the window even if the window is broken, which may increase a passenger's safety.

The following description will be made based on an example in which the front window 150 of the vehicle is the double-glazed window including the windshield and the inner cover layer. However, this is merely an example and the following description may also apply to a case in which the front window 150 of the vehicle is a single glass window.

The second directional light 120 may correspond to an external light source located on a path extending line of light output from the display panel 140 installed in the vehicle. For example, when an external light source (e.g., the sun) is located on an extending line that extends from a light traveling path, the second directional light 120 may be light that is output from the external light source in parallel with the extending line and incident in a direction to the vehicle. In this example, the extending line may be a line that extends from a traveling path of the light output from the display panel 140 installed in the vehicle before the light is reflected at the windshield or the inner cover layer in a driver's view direction. In this case, the extending line that extends the traveling path before the light output from the display panel 140 is reflected at the windshield or the inner cover layer in the driver's view direction may be parallel to the light output from the external light source and incident in the direction to the vehicle. In contrast, a direction in which the light output from the display panel 140 travels along the traveling path before the light is reflected at the windshield or the inner cover layer in the driver's view direction may be opposite to a direction in which the light output from the external light source is incident toward the vehicle.

As the amount of the first directional light 110 that is incident from the view in front of the vehicle and enters inside the vehicle increases, higher visibility for an outside of the vehicle is secured for the driver and the passengers of the vehicle. To secure the driving safety, a transmittance rate at which the first directional light 110 is transmitted from the outside of the vehicle to the inside of the vehicle may have a value greater than or equal to a threshold. For example, the vehicle may ensure a transmittance rate greater than or equal to 70% for the light incident from the vehicle's front view direction according to the traffic regulations.

As an amount of the second directional light 120 incident from an external light source at a predetermined position increases, a probability of the display panel 140 being damaged may increase or the display panel 140 may be more quickly damaged. Thus, blocking a greater amount of the second directional light 120 may be desirable. As described below, the HUD light shielding film according to example embodiments may more effectively block the second directional light 120.

As the third directional light 130 that is output from the display panel and is delivered toward a view of the driver increases, higher visibility for provided visual information is obtained. To enter the view of the passenger of the vehicle, the third directional light 130 may be reflected at the front window 150 of the vehicle, for example, the windshield or the inner cover layer, in a third direction. To secure the visibility for the visual information provided by the display panel, at least a predetermined portion of the output light may be reflected at the front window 150 of the vehicle. The third directional light 130 may secure the visibility by adjusting an intensity of the light output from the display panel 140.

Figure 2:
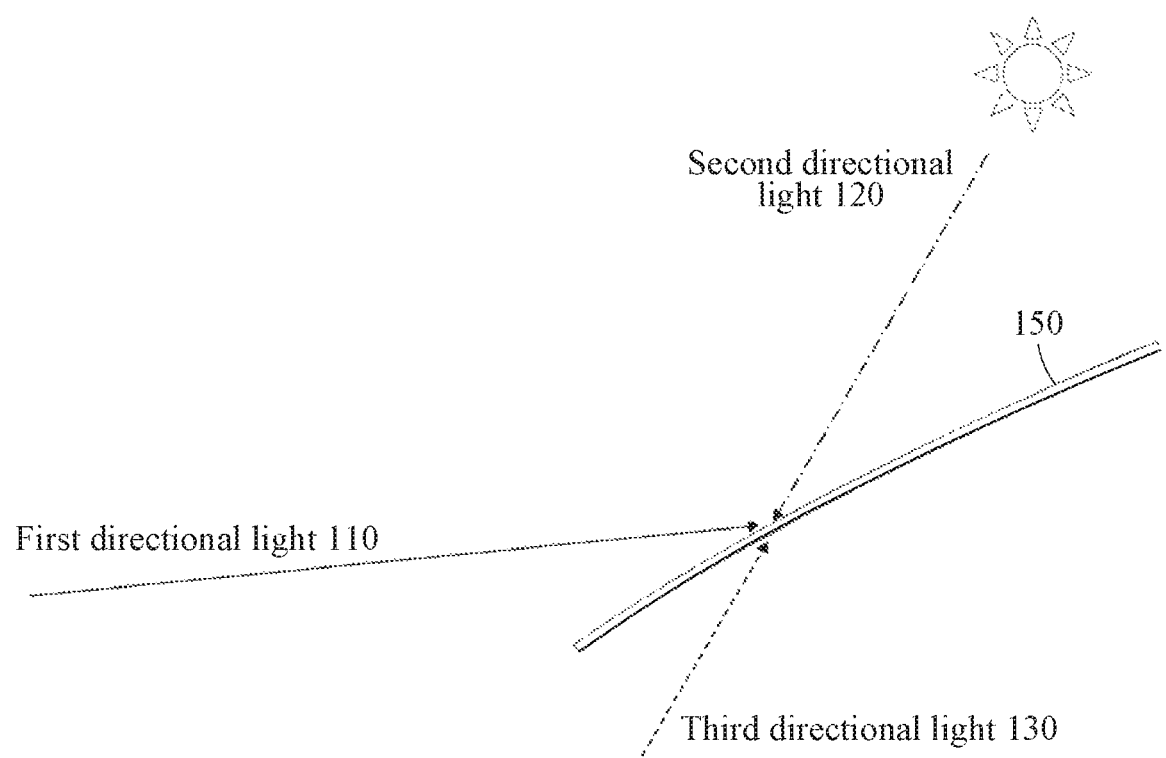
FIG. 2 is a diagram illustrating an effect to be achieved in a case in which a light shielding film for HUD is used in a vehicle HUD system according to an example embodiment.

FIG. 2 is a diagram illustrating an effect achieved in a case in which a light shielding film for HUD is used in a vehicle HUD system according to an example embodiment.

Referring to FIG. 2, a vehicle HUD system that includes a light shielding film for HUD may include a display panel, a magnification optical system, and a light shielding film for HUD. The display panel of FIG. 2 may correspond to the display panel 140 of FIG. 1 and the magnification optical system of FIG. 2 may correspond to the magnification optical system of FIG. 1.

Similar to the case in which the light shielding film is not included in the vehicle HUD system of FIG. 1, in a case in which the HUD light shielding film is included in the vehicle HUD system, the first directional light 110 and the second directional light 120 of FIG. 1 may be incident in different directions from an outside of the vehicle to a front window of the vehicle.

The HUD light shielding film may transmit the first directional light 110 corresponding to a view in front of the vehicle and block the second directional light 120 corresponding to an external light source located on a path extending line of light including visual information. By designing and arranging the HUD light shielding film appropriately, at least a portion of the second directional light 120 may be blocked by the HUD light shielding film, a transmittance rate of the first directional light 110 may have a value greater than or equal to a predetermined threshold, and at least a predetermined portion of the third directional light 130 may be reflected at the front window of the vehicle.

Figure 3:
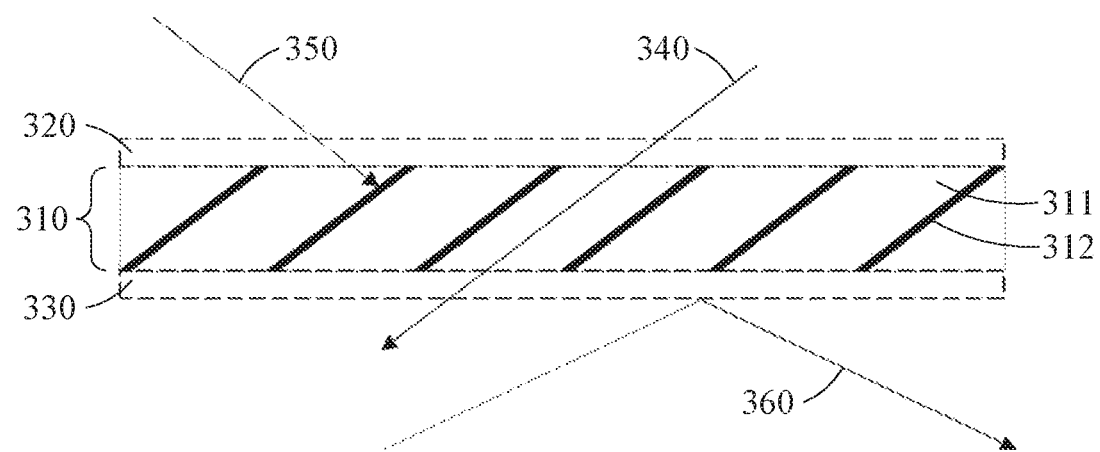
FIG. 3 is a diagram illustrating a configuration of a light shielding film for HUD according to an example embodiment.

FIG. 3 is a diagram illustrating a configuration of a light shielding film for HUD according to an example embodiment.

Referring to FIG. 3, a light shielding film for HUD may include a light shielding portion 310. The light shielding portion 310 may include a transparent material 311 that fills a space between a plurality of light shielding materials 312. The plurality of light shielding materials 312 may block light reaching the plurality of light shielding materials 312. For example, light 350 having an angle approximately perpendicular to a gradient of the plurality of light shielding materials 312 and reaching the plurality of light shielding materials 312 may be absorbed and blocked. The transparent material 311 may transmit light. Thus, light 340 incident on the transparent material 311 in parallel to the gradient of the plurality of light shielding materials 312 may pass the transparent material 311 without reaching the plurality of light shielding materials 312.

The transparent material 311 may be a material for filling the space between the plurality of light shielding materials 312 and may assist the plurality of light shielding materials 312 to block light. The transparent material 311 may be configured to physically fix the light shielding materials 312 such that the plurality of light shielding materials 312 has a predetermined gradient and/or are configured to absorb at least a portion of shock applied to the light shielding materials 312 to protect the plurality of light shielding materials 312 from an external shock and prolong a life of the HUD light shielding film.

The HUD light shielding film may be located between a windshield and an inner cover layer of the vehicle, located outward the windshield of the vehicle, or located inward the inner cover layer of the vehicle. Also, the HUD light shielding film may be provided over the entire front window of the vehicle, or may be provided to correspond to only a portion of the front window of the vehicle on which light output from the display panel 140 is incident on the front window.

Various arrangements of the HUD light shielding film will be described in detail with reference to FIGS. 5, 6, 9 and 10.

To reflect the light output from the display panel, the HUD light shielding film may further include a light reflecting material 330. The light reflecting material 330 may be disposed on a surface of the light shielding portion 310.

The HUD light shielding film may further include a light transmitting material 320 to protect a vehicle, a passenger, the light shielding portion 310, and the like from an external environment. The light transmitting material 320 may be disposed on a surface of the light shielding portion 310 opposite to the light reflecting material 330. The external environment may include, for example, an external material and energy transmitted from an outside such as shocks.

However, the light reflecting material 330 and the light transmitting material 320 may not be necessarily included in the HUD light shielding film. The function of the light reflecting material 330 and the function of the light transmitting material 320 may be partially or fully performed by another component of the vehicle. As an example, the windshield be configured to protect the vehicle, the passenger, and the HUD light shielding film from the external environment. When a shielding film is located inside of the windshield based on the passenger in the vehicle, the windshield, the light transmitting material 320 may not be required. As another example, the inner cover layer of the vehicle may be configured to reflect the light output from the display panel. When the shielding film is located outside of the inner cover layer based on the passenger in the vehicle, the light reflecting material 330 may not be required.

Figure 4:
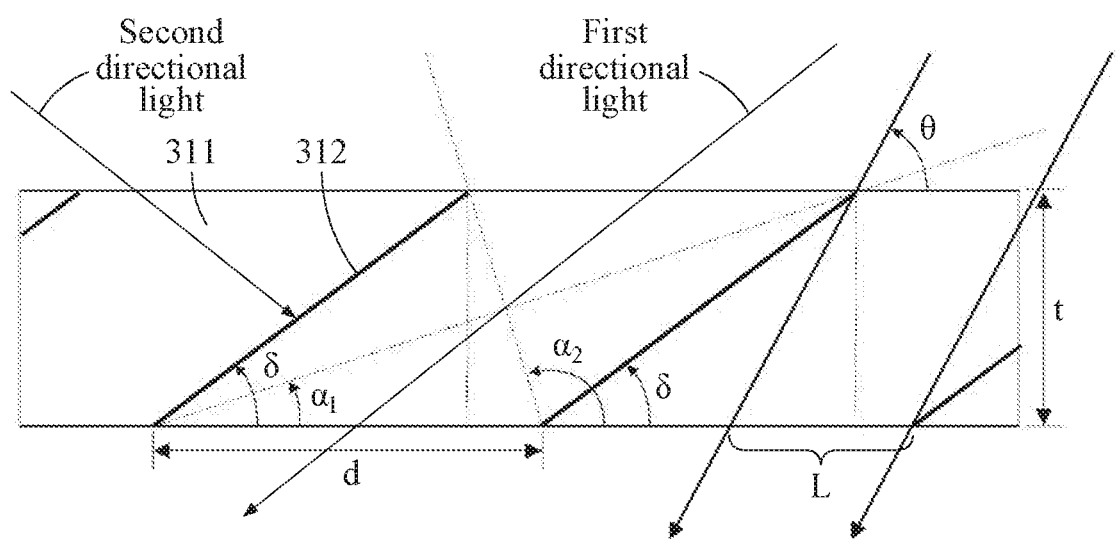
FIG. 4 is a diagram illustrating a design of a light shielding film for HUD according to an example embodiment.

FIG. 4 is a diagram illustrating a design of a light shielding film for HUD according to an example embodiment.

Referring to FIG. 4, a light shielding film for HUD may be designed by determining gradients $\delta$ of a plurality of light shielding materials, spaces d between the plurality of light shielding materials, and a thickness t of a light shield. $\delta$ may be a value determined based on a degree to which the plurality of light shielding materials is inclined in a counterclockwise direction based on a bottom surface of the HUD light shielding film.

$\delta$, d, and t may be determined based on a target transmittance rate of the first directional light 110 and a target shading ratio of the second directional light 120. The target transmittance rate may be a transmittance rate of the first directional light 110 to be achieved by a design of the HUD light shielding film, and may be set to a value greater than or equal to a threshold transmittance rate required to secure a driving safety. The target shading ratio may be a ratio at which the second directional light 120 is blocked and may be achieved by a design of the HUD light shielding film. The target shading ratio may be set to a value required to prevent damage to the display panel.

The HUD light shielding film may be designed to transmit light entering at a gradient greater than $\alpha_1$ and less than $\alpha_2$, where $\alpha_1 < \alpha_2$. In this case, $\alpha_1$ and $\alpha_2$ are values determined based on a degree of counterclockwise inclination based on the bottom surface of the HUD light shielding film.

A geometrical relationship of $\alpha_1$, $\delta$, d, and t may be as shown in Equation 1 below.

$$t\tan\left(\frac{\pi}{2} - \alpha_1\right) - t\tan\left(\frac{\pi}{2} - \delta\right) = d \qquad \text{[Equation 1]}$$

Based on Equation 1, $\alpha_1$ may be expressed using $\delta$, d, and t as shown in Equation 2 below.

$$\alpha_1 = \cot^{-1}\left(\cot\delta + \frac{d}{t}\right) \qquad \text{[Equation 2]}$$

A geometrical relationship of $\alpha_2$, $\delta$, d, and t may be as shown in Equation 3 below.

$$t\tan\left(\frac{\pi}{2} - (\pi - \alpha_2)\right) - t\tan\left(\frac{\pi}{2} - \delta\right) = d \quad \text{[Equation 3]}$$

Based on Equation 3, $\alpha_2$ may be expressed using $\delta$, d, and t as shown in Equation 4 below, $$\alpha_2 = \cot^{-1}\left(\cot\delta - \frac{d}{t}\right) \quad \text{[Equation 4]}$$

When a gradient $\theta$ of the light entering the HUD light shielding film is less than $\alpha_1$ or greater than $\alpha_2$, the light entering the HUD light shielding film may be blocked by the plurality of light shielding materials. When $\theta$ has a value ranging between $\alpha_1$ and $\alpha_2$, where $\alpha_1 < \theta < \alpha_2$ the light entering the HUD tight shielding film may pass through the light shielding film and enter the vehicle. However, even in this case, the light entering the light shielding film may not pass through the light shielding film at a transmittance rate of 100%. Even if gradients are the same, light incident from some positions may reach the plurality of fight shielding materials. In this case, a portion of the light may be blocked.

When $\theta$ has a value ranging between $\alpha_1$ and $\alpha_2$, a transmittance rate of the light entering the light shielding, film may be obtained according to Equation 5 below.

$$P(\theta) = \frac{d - |t\cot\delta - t\cot\theta|}{d} = 1 - \frac{t}{d}\left|\cot\delta - \cot\theta\right| \quad \text{[Equation 5]}$$

In Equation 5, $P(\theta)$ denotes a transmittance rate.

Based on Equations 1 through 5, $\delta$, d, and t may be determined based on gradients $\alpha_1$ of light to be passed and gradient $\alpha_2$ of light to be blocked, and the transmittance rate of the light to be passed $P(\theta)$, The HUD light shielding film may be designed based on the determined $\delta$, d, and t.

According to an example embodiment, the gradients of the plurality of light shielding materials may have values ranging between 40 degrees)(°) and 85°, the space between the plurality of light shielding materials may have a value ranging between 0.3 millimeters (mm) and 0.5 mm, and a thickness of the light shielding film may have a value ranging between 0.35 mm and 0.40 mm, for example, a value of about 0.38 mm.

Figure 5:
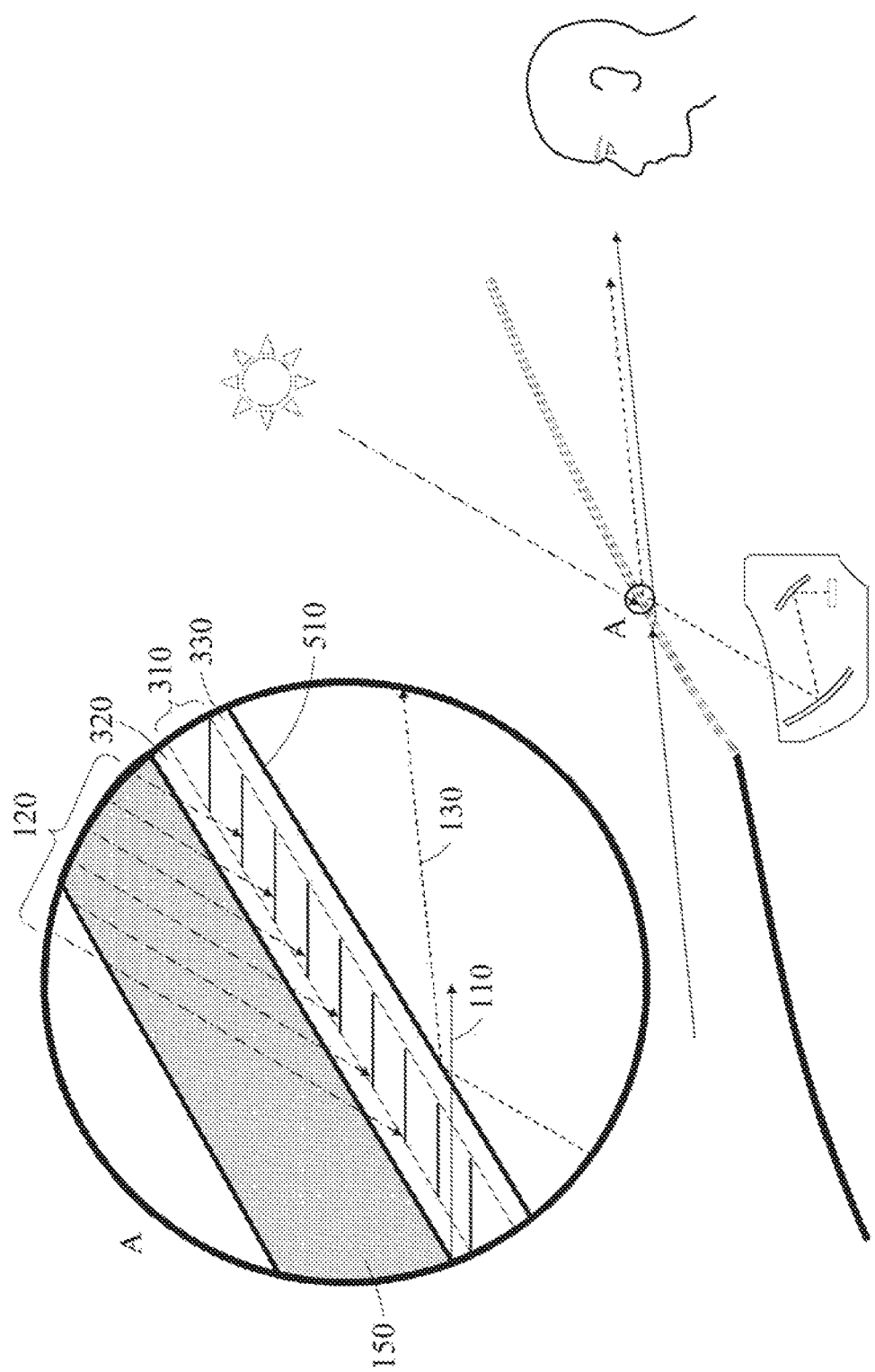
FIG. 5 is a diagram illustrating a case in which a light shielding film for HUD is located inward a front window of a vehicle according to an example embodiment.

FIG. 5 is a diagram illustrating a case in which a light shielding film for HUD is located inward a front window of a vehicle according to an example embodiment.

Referring to FIG. 5, an HUD light shielding film may be located at an inner side of a front window. When the light shielding film is located at an inner side of the front window, the third directional light 130 may reach the HUD light shielding film before the front window. Thus, the HUD light shielding film may have a material having a property of reflecting light in a lower end portion.

When the HUD light shielding film is located at an inner side of the front window, the front window may protect a vehicle, a passenger, the HUD light shielding film, and the like from an external environment. In this case, a light transmitting material may not be necessarily included in the HUD light shielding film.

The second directional light 120 may be absorbed by the plurality of light shielding materials and thus, may not enter the front window. Therefore, the second directional light 120 may not damage a display panel.

Figure 6:
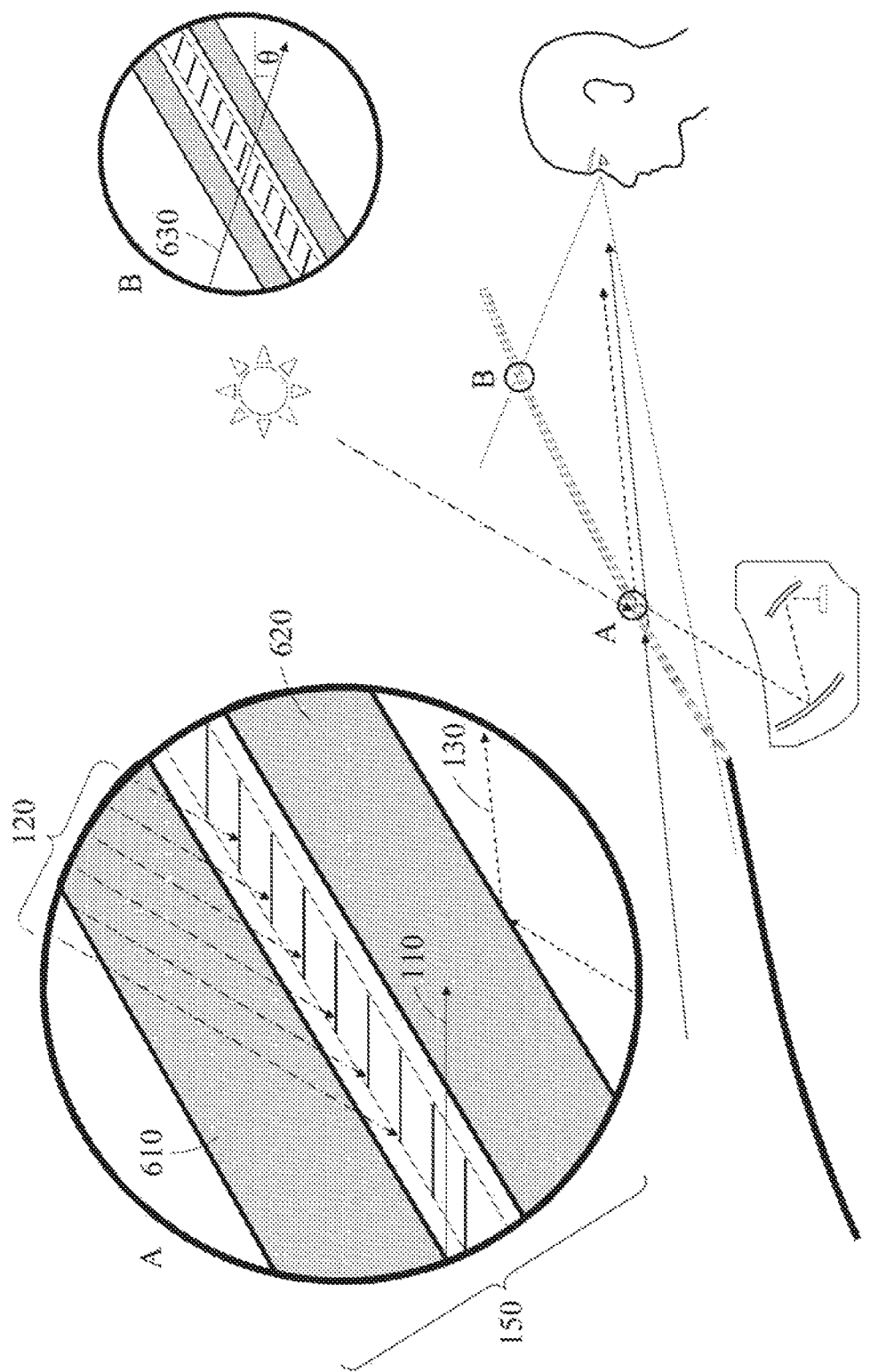
FIG. 6 is a diagram illustrating a case in which a light shielding film for HUD is located between double glass panes of a front window of a vehicle according to an example embodiment.

FIG. 6 is a diagram illustrating a case in which a light shielding film for HUD is located between double glass panes of a front window of a vehicle according to an example embodiment.

Referring to FIG. 6, an HUD light shielding film may be located between double glass panes of a front window. The HUD light shielding film may be located between a windshield 610 and an inner cover layer 620. When the HUD light shielding film is located between the windshield and the inner cover layer, the inner cover layer may reflect light output from a display panel. Thus, in a case in which the HUD light shielding film is located between the windshield 610 and the inner cover layer 620, a light reflecting material may not be necessarily included in the HUD light shielding film.

Also, when the HUD light shielding film is located between the windshield 610 and the inner cover layer 620, the windshield may protect a vehicle, a passenger, the HUD light shielding film, and the like from an external environment. Accordingly, in a case in which the HUD light shielding film is between the windshield 610 and the inner cover layer 620, a light transmitting material may not be necessarily included in the HUD light shielding film.

When the HUD light shielding film is located between the windshield 610 and the inner cover layer 620, the HUD light shielding film may hold fragments such that the fragments are bounced off from the window relatively less even if the window is broken. Thus, when the HUD light shielding film is located between the windshield 610 and the inner cover layer 620, a safety for a passenger in the vehicle may be enhanced.

The HUD light shielding film may be located at an outer side of the front window. In this case, the HUD light shielding film may be exposed to the external environment before the front window. Thus, a material having a property of protecting a target object from the external environment may be included in an upper end portion of the HUD light shielding film. Since the material having the property of protecting the target object from the external environment must not interfere with the driving, the material may further include a property of transmitting light basically.

When the HUD light shielding film is located at an outer side of the front window, the front window may reflect light output from the display panel. Accordingly, in this case, a light reflecting material may not be necessarily included in the HUD light shielding film.

To secure a maximum transmittance rate of the first directional light 110, a gaze direction of a driver may be parallel to a plurality of light shielding materials. An angle between the gaze direction and the front window may vary based on a height of the front window. When the plurality of light shielding materials are designed that various gaze directions are parallel to the plurality of light shielding materials, the plurality of light shielding materials may not be parallel to one another and have different gradients 630 based on positions. Related description will be made with reference to FIG. 8.

Figure 7A:
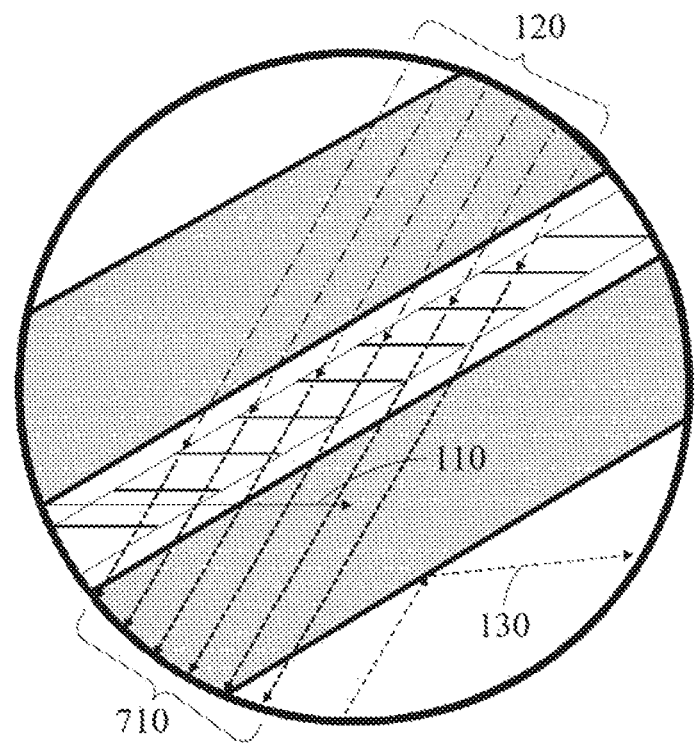
FIG. 7A is a diagram illustrating light traveling in a case in which a plurality of light shielding materials has a property of polarizing light according to an example embodiment.

FIG. 7A is a diagram illustrating light traveling in a case in which a plurality of light shielding materials has a property of polarizing light according to an example embodiment.

Referring to FIG. 7A, a plurality of light shielding materials included in an HUD light shielding film may have a property of polarizing light instead of completely absorbing and blocking light. The second directional light 120 reaching materials having a property of polarizing light among the plurality of light shielding materials may be polarized to have a predetermined polarity and pass through the light shielding materials. When the second directional light 120 is polarized, one of a p-polarity and an s-polarity may enter the vehicle and thus, an amount of light may be reduced by about 50%.

When the plurality of light shielding materials has the property of polarizing light instead of completely absorbing and blocking light, the first directional light 110 may not be completely blocked and may be transmitted to reach an FOV of a passenger by the polarized amount of light, even if the first directional light 110 reaches the plurality of light shielding materials. Light entering the vehicle among the second directional light 120 may be blocked by the display panel according to a method described with reference to FIG. 7B.

Figure 7B:
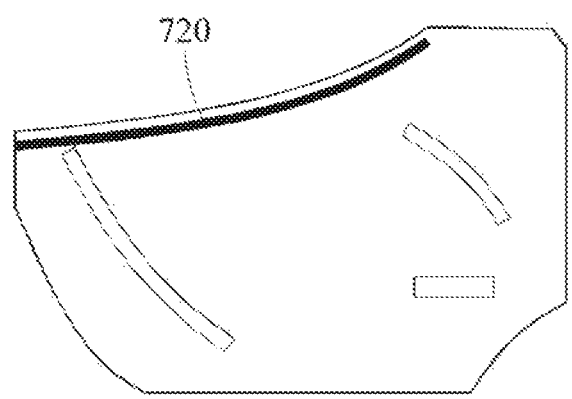
FIG. 7B is a diagram illustrating an HUD system in a case in which a plurality of light shielding materials has a property of polarizing light according to an example embodiment.

FIG. 7B is a diagram illustrating an HUD system in a case in which a plurality of light shielding materials has a property of polarizing light according to an example embodiment.

Referring to FIG. 7B, when a plurality of light shielding materials has a property of polarizing light instead of completely absorbing and blocking light, the second directional light 120 may be polarized to have a predetermined polarity and pass through the light shielding materials.

When the second directional light 120 is polarized, one of a p-polarity and an s-polarity may enter the vehicle, and thus, an amount of light may be reduced by about 50%. In some cases, reducing the amount of the second directional light 120 of FIG. 1 by about 50% may not be enough to prevent damage to the display panel.

In such cases, to block the second directional light 120 entering the vehicle, a material 720 having a property of polarizing light may be further provided on a path of light output from the display panel. For example, when the plurality of light shielding materials absorb s-polar light and transmit p-polar light, a material that transmits the s-polar light and absorbs the p-polar light may be further provided on the path of the light output from the display panel. Also, when the plurality of light shielding materials absorb the p-polar light and transmit the s-polar light, a material that transmits the p-polar light and absorbs the s-polar light may be further provided on the path of the light output from the display panel.

As such, the material 720 having the property of polarizing light may be further provided on the path of the light output from the display panel, whereby the second directional light 120 (refer to FIG. 7A) enters inside the vehicle while prevented from entering the display panel. Also, even if the first directional light 110 reaches the plurality of light shielding materials, a polarized component may reach a view of a passenger without being completely blocked.

Figure 8:
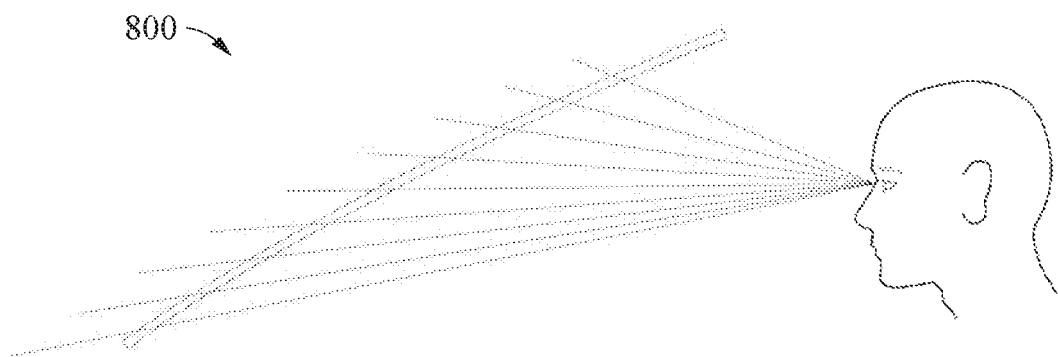
FIG. 8 is a diagram illustrating a gaze of a passenger in a vehicle according to an example embodiment.

FIG. 8 is a diagram illustrating a gaze of a passenger in a vehicle according to an example embodiment.

FIG. 8 illustrates various example gaze directions of a passenger of a vehicle. For example, based on a position at which the passenger of the vehicle gazes, an angle between a front windshield and a gaze direction of the passenger facing upward may be different from an angle between the front windshield and a gaze direction of the passenger facing downward.

Gradients of the plurality of light shielding materials may be determined in consideration of the angle between the front windshield and the gaze direction varying based on the position at which the passenger gazes. The gradients of the light shielding materials may be determined to be parallel with various gaze directions of the passenger of the vehicle. In this case, the light shielding materials may be determined to have different gradients based on positions of the light shielding materials. In some cases, the light shielding materials may be determined to have the same gradient.

When the plurality of light shielding materials is determined to have different gradients parallel to the corresponding gaze directions of the passenger, a transmittance rate of the first directional light 110 of FIG. 1 coming from outside the vehicle into the vehicle may be relatively high as compared to a case in which the plurality of light shielding materials is determined to have the same gradient.

When the plurality of light shielding materials is determined to have the same gradients, ease of design and efficiency of costs may increase as compared to a case in which the plurality of light shielding materials is determined to have the different gradients parallel to the gaze directions of the passenger.

Figure 9:
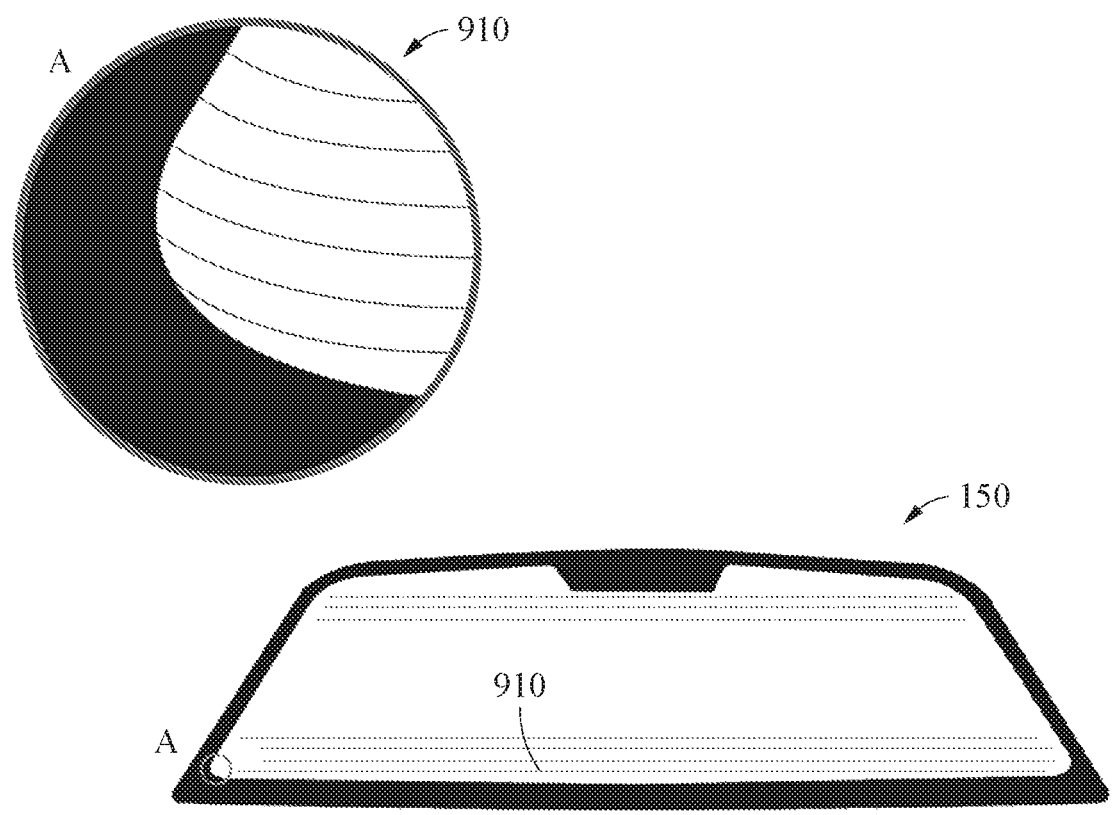
FIG. 9 is a diagram illustrating a light shielding film for HUD disposed on a front window of a vehicle according to an example embodiment.

FIG. 9 is a diagram illustrating a light shielding film for HUD disposed on a front window of a vehicle according to an example embodiment.

Referring to FIG. 9, a light shielding film for HUD may be located on a front window of a vehicle. Depending on designs, the HUD light shielding film may be disposed internally or externally along a surface of the front window of the vehicle or inserted between double glass panes of the front window. In any of the cases, a plurality of light shielding materials may be arranged in a cascade in a first direction as indicated by 910.

The light shielding materials of the HUD light shielding film may be arranged in parallel to one another. For example, the HUD light shielding film may be provided over the entire front window of the vehicle to provide a same view as a driver to a passenger sit in a front passenger seat in the vehicle.

Figure 10:
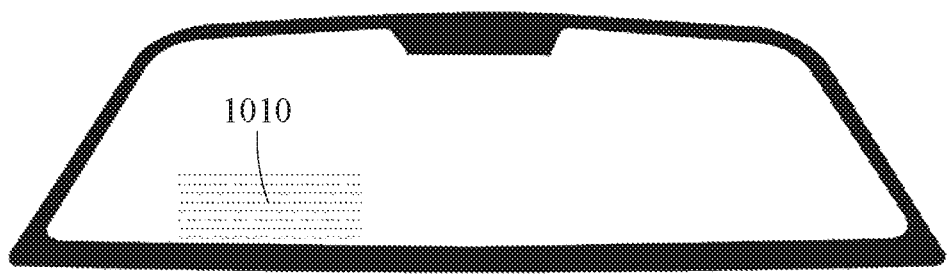
FIG. 10 is a diagram illustrating a light shielding film for HUD located to correspond to a portion on which light output from a display panel is incident on a front window of a vehicle according to an example embodiment.

FIG. 10 is a diagram illustrating a light shielding film for HUD located to correspond to a portion on which light output from a display panel is incident on a front window of a vehicle according to an example embodiment.

Referring to FIG. 10, a light shielding film for HUD 1010 may be located to correspond to only a portion on which light output from a display panel is incident on a front window of a vehicle.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A light shielding film for head-up display (HUD), the light shielding film comprising:
    a plurality of light shielding materials configured to transmit a first directional light propagating from a view in front of a vehicle in a first direction and block at least a portion of a second directional light propagating from an external light source in a second direction that is opposite to a third direction in which light is output from a display panel for HUD included in the vehicle, at least one gradient of the plurality of light shielding materials corresponding to the first direction; and
    a transparent material that fills a space between the plurality of light shielding materials, wherein the plurality of light shielding materials are configured to polarize light.

2. The light shielding film of claim 1, wherein gradients of the plurality of light shielding materials are within a range of 40° to 85°.

3. The light shielding film of claim 1, wherein a length of the space between the plurality of light shielding materials is within a range of 0.3 mm to 0.5 mm.

4. The light shielding film of claim 1, wherein a thickness of the light shielding film is within a range of 0.35 mm to 0.40 mm.

5. The light shielding film of claim 1, further comprising:
a light reflecting material provided on the plurality of light shielding materials and the transparent material, the light reflecting material being configured to reflect the light output from the display panel.

6. The light shielding film of claim 1, further comprising:
a light transmitting material provided on the plurality of light shielding materials and the transparent material, the light transmitting material being configured to protect the vehicle from an external environment.

7. The light shielding film of claim 1, wherein gradients of the plurality of light shielding materials correspond to a plurality of gazing directions of a driver of the vehicle.

8. The light shielding film of claim 7, wherein the gradients of the plurality of light shielding materials correspond to positions of the plurality of light shielding materials.

9. A head-up display (HUD) system for vehicle, the HUD system comprising:
a display panel configured to output light including visual information;
a magnification optical system configured to magnify the visual information to be displayed; and
a light shielding film comprising a plurality of light shielding materials configured to transmit a first directional light propagating from a view in front of the vehicle in a first direction and block at least a portion of a second directional light propagating from an external light source in a second direction that is opposite from a third direction in which the light including the visual information is output from the display panel, at least one gradient of the plurality of light shielding materials corresponding to the first direction,
wherein the plurality of light shielding materials are configured to polarize light.

10. The HUD system of claim 9, wherein at least a portion of the plurality of light shielding materials have different gradients.

11. The HUD system of claim 9, wherein at least a portion of the light output from the display panel including the visual information is reflected by a transparent layer provided adjacent to the light shielding film.

12. The HUD system of claim 9, wherein gradients of the plurality of light shielding materials are within a range of 40° to 85°.

13. The HUD system of claim 9, wherein a length of a space between the plurality of light shielding materials is within a range of 0.3 mm to 0.5 mm.

14. The HUD system of claim 9, wherein a thickness of the light shielding film is within a range of 0.35 mm to 0.40 mm.

15. The HUD system of claim 9, wherein the light shielding film for HUD further comprises:
a light reflecting material provided on a first surface of the light shielding film and configured to reflect the light output from the display panel.

16. The HUD system of claim 9, wherein the light shielding film for HUD further comprises:
a light transmitting material provided on a second surface of the light shielding film and configured to protect the vehicle from an external environment.

17. The HUD system of claim 9, wherein the plurality of light shielding materials are configured to polarize light, and
a material configured to polarize light is further provided on a path of the light output from the display panel.

18. The HUD system of claim 17, wherein the plurality of light shielding materials are further configured to polarize s-polar light and transmit p-polar light, and
wherein the material is further configured to transmit the s-polar light and absorb the p-polar light.

19. The HUD system of claim 17, wherein the plurality of light shielding materials are further configured to absorb p-polar light and transmit s-polar light, and
wherein the material is further configured to transmit the p-polar light and absorb the s-polar light.

20. The HUD system of claim 9, wherein the plurality of light shielding materials are configured to absorb a portion of light incident on the plurality of light shielding materials.

21. The HUD system of claim 9, wherein the light shielding film is provided between a windshield of the vehicle and an inner cover layer of the vehicle, at an outer side of the windshield of the vehicle, or at an inner side of the inner cover layer.

22. The HUD system of claim 9, wherein the light shielding film is provided to correspond to a portion of a front window of the vehicle on which the light output from the display panel is incident.

23. The HUD system of claim 9, wherein the external light source corresponds to a sun.

* * * * *